US005914736A

United States Patent [19]
Tamura

[11] Patent Number: 5,914,736

[45] Date of Patent: Jun. 22, 1999

[54] CARRIAGE DRIVE CONTROL SYSTEM FOR PRINTER

[75] Inventor: Yasuyuki Tamura, Yokohama, Japan

[73] Assignee: Canon Kabushiki Kaisha, Tokyo, Japan

[21] Appl. No.: 08/946,568

[22] Filed: Oct. 7, 1997

Related U.S. Application Data

[63] Continuation of application No. 08/361,638, Dec. 22, 1994, abandoned.

[30] Foreign Application Priority Data

Dec. 28, 1993 [JP] Japan .................................... 5-336701

[51] Int. Cl.[6] ................................ B41J 23/00; H02P 5/28

[52] U.S. Cl. ............................. 347/37; 318/807; 388/848

[58] Field of Search .................................... 347/37, 14, 9; 318/800–812, 606; 388/848–855

[56] References Cited

U.S. PATENT DOCUMENTS

| | | | |
|---|---|---|---|
| 4,887,167 | 12/1989 | Miura | 358/296 |
| 5,076,178 | 12/1991 | Kohl et al. | 110/250 |
| 5,097,189 | 3/1992 | Ito et al. | 347/37 |
| 5,147,304 | 9/1992 | Fladung | 604/110 |
| 5,245,935 | 9/1993 | Fukuda | 110/250 |
| 5,282,428 | 2/1994 | Greville et al. | 110/250 |
| 5,336,862 | 8/1994 | Yelvington | 219/68 |

FOREIGN PATENT DOCUMENTS

| | | |
|---|---|---|
| 0441407 | 8/1991 | European Pat. Off. . |
| 57-074759 | 5/1982 | Japan . |
| 62-245931 | 10/1987 | Japan . |
| 1249373 | 10/1989 | Japan . |
| 2 273 231 | 12/1992 | United Kingdom . |

OTHER PUBLICATIONS

Iwazawa et al., "High–Speed Motion Control for Printhead Carriage Transportation," NEC Research and Development, vol. 34, No. 3, pp. 360–371, (1993).

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A system and method for driving a carriage of a serial printer. The printer is operated such that Fourier components of a speed in one reciprocal movement of the carriage can be expressed by Fourier components of lower degrees. At the same time, carriage vibrations can be suppressed, and printing can be performed at high speed. Almost no approach range is assured, and the printer can be made compact.

4 Claims, 6 Drawing Sheets

CARRIAGE DRIVE CONTROL SYSTEM FOR PRINTER

This application is a continuation of U.S. application Ser. No. 08/361,638, filed Dec. 22, 1994, now abandoned.

BACKGROUND OF THE INVENTION

1. Field of the Invention

The present invention relates to a carriage drive control system for a printer and, more particularly, to a carriage drive control system for a printer in which a recording head is mounted on a carriage to move the recording head for a recording scan.

2. Description of the Related Art

In a conventional carriage drive control system for a printer, the following recording scheme is very popular. A recording head is mounted on a carriage, a recording medium is set to oppose the recording head, which is reciprocated along a main scanning direction to perform recording, and, at the same time, the recording medium is fed in a subscanning direction to perform recording on the entire surface of the recording medium.

In this case, the operation range of the carriage is set slightly larger than the width of a recording medium portion to be recorded. The recording head is abruptly accelerated in an approach range where the recording head does not reach a portion to be recorded. When the speed of the recording head reaches a predetermined speed, the recording head is moved at a constant speed while recording information on the recording medium. When the recording head falls outside a recordable range, the recording head is abruptly decelerated, so that it can be returned to the home position at a high speed, thereby completing one carriage operation cycle. In an arrangement for recording information in a return or backward path in the same manner as in the forward path, the recording head is also moved at a constant speed even in the return path while recording information on a recording medium.

In a printer for recording information at a high speed, a carriage must be abruptly accelerated in an approach range. For this purpose, a large motor having a large torque must be used. To increase the speed of the carriage, a long approach range is required. Upon an increase in speed, the carriage is vibrated due to a variation in abrupt acceleration. In practice, a recordable area is an area where the vibration is already eliminated. Therefore, a considerably long approach range is required.

A deceleration range is required at a terminal end side of the recording area to decelerate the carriage. To decelerate the carriage which is moving at a high speed, a long deceleration range is also required.

As described above, the long approach range and the long deceleration range must be assured, or the large motor or a large-capacity power supply for driving this large motor or the like must be arranged. As a result, the printer becomes inevitably bulky.

In a high-speed printer, the acceleration of a carriage is large, and it is difficult to prevent the vibration of the carriage. This may cause not only degradation of the quality of a recorded image, but also vibrations of the printer main body and generation of noise.

In particular, in a printer using an ink-jet scheme as a recording scheme, the ink pressure varies depending on the acceleration, the injection state changes, and the recorded image is degraded.

SUMMARY OF THE INVENTION

It is an object of the present invention to solve the conventional drawbacks described above and set Fourier components of a speed in one reciprocal movement of a carriage to consist of terms of 10th degree or less.

It is another object of the present invention to set Fourier components of a speed in one reciprocal movement of a carriage to consist of terms of third degree or less.

The above and other objects, advantages, and features of the present invention will be apparent from the detailed description of the preferred embodiments in conjunction with the accompanying drawings.

DETAILED DESCRIPTION OF THE PREFERRED EMBODIMENTS

Figure 1:
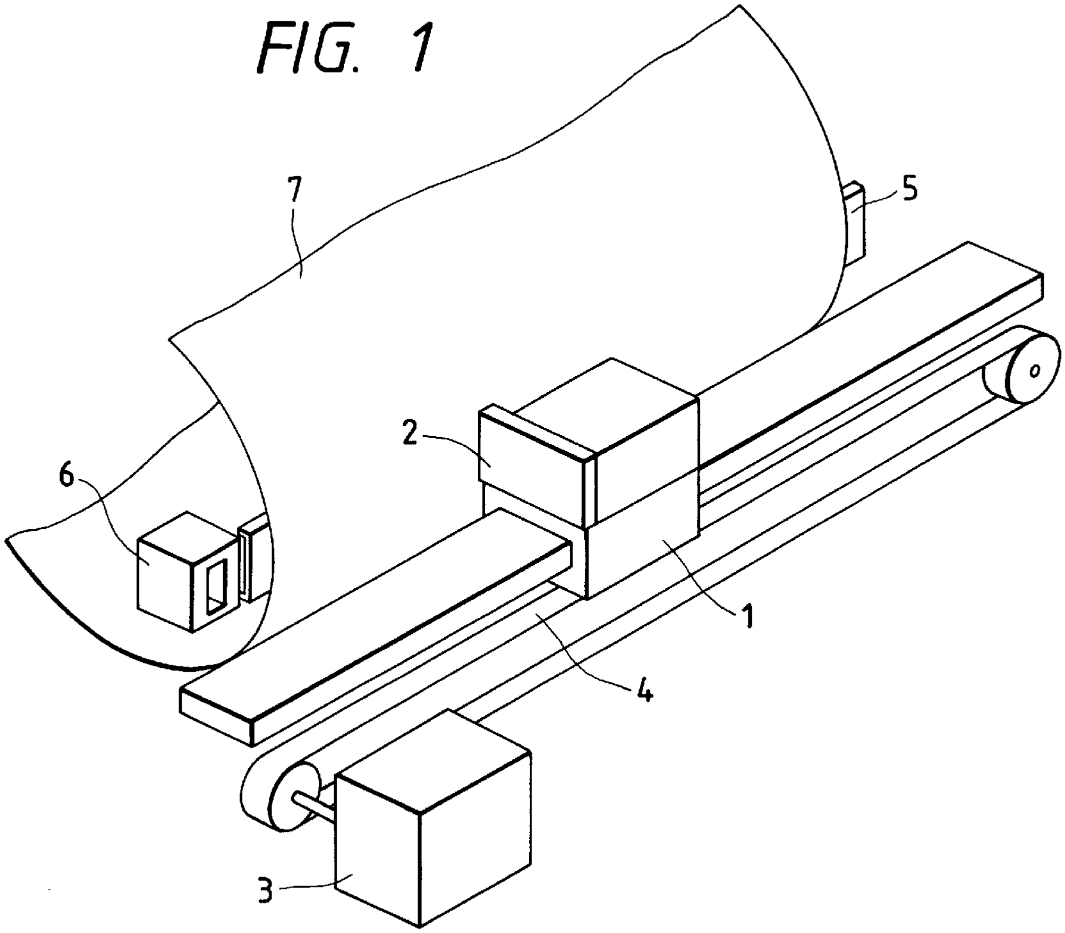
FIG. 1 is a perspective view showing the arrangement of a printer according to the present invention.

The preferred embodiments of the present invention will be described below with reference to the accompanying drawings. First, the principle of driving a carriage according to the present invention will be described.

In carriage drive control for a printer, a carriage is vibrated due to resonance between the carriage and its peripheral mechanical devices. In general, in a printer, when an abrupt change in acceleration is present, the change has very complicated acceleration frequency components, thereby causing resonance.

To prevent this, an implementation is made to eliminate the resonant frequency of the mechanical devices. In a printer having a movable carriage, as the resonant frequency changes in a complicated manner, elimination of the resonant frequency cannot be achieved by removing only a specific frequency component. In the printer having the movable carriage, the resonant frequency of a rail which supports the carriage and a belt for driving the carriage changes depending on a carriage position.

According to the present invention, frequency components of a certain degree or more are removed to prevent the resonance.

A speed v can be generally expressed by a Fourier series as follows:

$$v=\Sigma\{a_n \sin(2\pi\times nt/\tau)+b_n \cos(2\pi\times nt/\tau)\}$$

where τ is a time required to reciprocate the carriage once.

A carriage position x and a carriage acceleration α can be defined as follows:

$$x=\sum\left\{\frac{-a_n\tau}{2n\pi}\cos(2\pi\times nt/\tau)+\frac{b_n\tau}{2n\pi}\sin(2\pi\times nt/\tau)\right\}$$

$$\alpha=\sum\left\{\frac{2n\pi a_n}{\tau}\cos(2\pi\times nt/\tau)+\frac{2n\pi b_n}{\tau}\sin(2\pi\times nt/\tau)\right\}$$

As is apparent from the above equations, if Fourier coefficient terms of higher degrees of the speed v are present, coefficients of the acceleration α which correspond to these terms are large. The maximum value of the acceleration α is increased accordingly. However, if no terms of higher degrees are present, the maximum torque of the motor need not be so large.

In general, in a compact printer, the time τ required for reciprocating the carriage once is about one sec or more. In contrast to this, the resonant frequency of the mechanical devices is several tens of Hz or more. In a large printer, the resonant frequency becomes low, but the time τ is undesirably prolonged. If the Fourier components of 10th degree or more are removed, no resonance occurs even if the resonant frequency of the mechanical devices slightly changes.

When the rigidity of the mechanical devices of a printer is low, the resonant frequency becomes low, and resonance may occur. In this case, vibrations are generated by frequency components of 10th degree or less and occur five times or less with a long period in the widthwise direction of a recorded image. For this reason, vibrations produce almost unnoticeable noise on an image and have good reproducibility. The recording head is driven in accordance with a carriage position to facilitate control which allows a recorded image to be free from the influence of the vibrations.

When the speed consists of only Fourier components of third degree or less, vibrations are generated by only components of less than one period at least in the forward or backward path. Therefore, no image disturbance occurs which is recognized as a periodical vibration on the recorded image.

A printer to which the present invention is applied will be described with reference to FIG. 1.

Referring to FIG. 1, the printer comprises a carriage 1 on which a recording head 2 is mounted, and a motor 3 for reciprocating, through a belt 4, the carriage 1 mounted with the recording head 2. The printer also comprises a platen 5, and a cap 7 mounted at an end portion of the platen 5. The recording head 2 records information on a recording medium 7.

In this printer, the carriage 1 is located at the position of the cap 6 in an inoperative state and urges the cap 6 against the recording head 2. In a recording mode, the carriage 1 reciprocates along positions opposing the recording medium 7. The carriage 1 causes a paper feed mechanism (not shown) to move the recording medium 7 in a subscanning direction, thereby recording information on the recording medium 7.

The motor 3 may be a pulse motor or a DC motor used together with an encoder. When the DC motor used together with the encoder is used, the motor 3 can be controlled at an almost predetermined speed, and the drive timings of the recording head 2 can be determined on the basis of a signal from the encoder, thereby performing accurate recording and eliminating vibrations and noise which are caused by a pulse motor.

Figure 2:
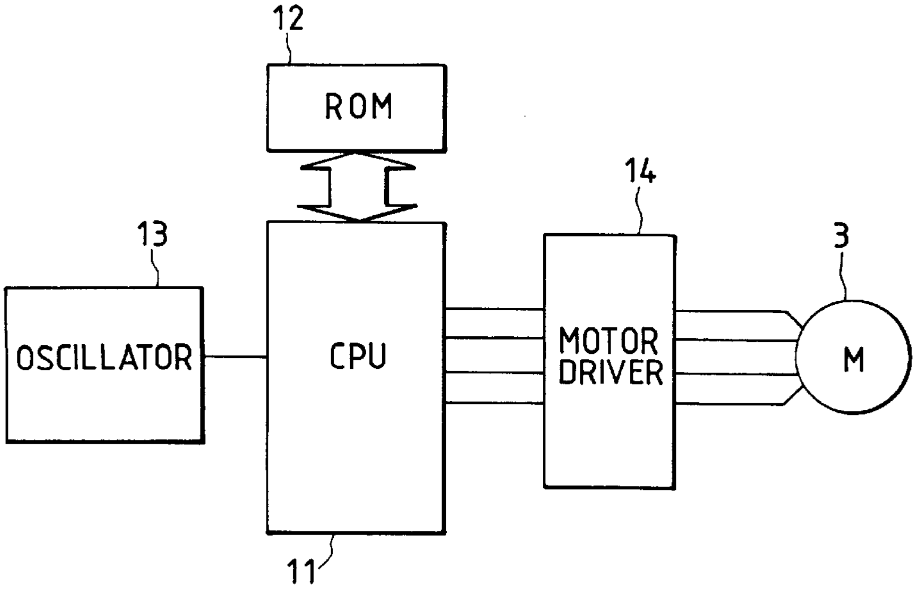
FIG. 2 is a block diagram of a drive control circuit for a motor shown in FIG. 1.

FIG. 2 shows a control circuit for the motor 3 shown in FIG. 1. Referring to FIG. 2, the control circuit comprises a CPU 11 serving as a controller for controlling the overall operation of the printer, a ROM 12 which stores control programs, an oscillator 13 for generating a reference clock for the CPU 11, and a motor driver 14. The motor driver 14 drives the motor 3 in accordance with a drive signal input from the CPU 11. At this time, the drive signal output from the CPU 11 to the motor driver 14 is a signal set such that Fourier components of a speed in one reciprocal movement of the carriage 1 consist of terms of lower degrees (e.g., 10th degree or less).

The recording head 2 mounted on the carriage 1 is an ink-jet recording head because the speed of the carriage 1 of the printer may not be set constant even during the recording operation.

In this case, to record an image at a predetermined position without any distortion, the recording head drives the recording head at an unequal time interval depending on the carriage position, thereby recording each pixel.

In a printer using a recording method such as a thermal transfer recording method, when a recording head is driven at an unequal time interval, recording conditions cannot be determined, and the density of a recorded image becomes nonuniform, thus posing a problem. To the contrary, when an on-demand ink-jet recording scheme is employed as a recording method, an ink injection time is shorter than a time required for moving the carriage by a distance corresponding to one pixel. Therefore, no special control is required.

In the printer according to the present invention, a smooth operation can be performed in all the regions in which the carriage moves. For this reason, no approach range or deceleration range is assured. However, at a position where the moving direction is reversed, a small approach range and a small deceleration range are preferably assured because an error occurs in the carriage operation due to play of the mechanism.

In any case, according to the present invention, since the approach range and the deceleration range need not be assured, the printer can be made compact. In addition, since the moving distance of the carriage can be shortened, the high-speed operation can be performed without increasing the drive frequency of the recording head.

(First Embodiment)

A carriage speed can be expressed by only terms of the first degree in this embodiment.

Figure 3:
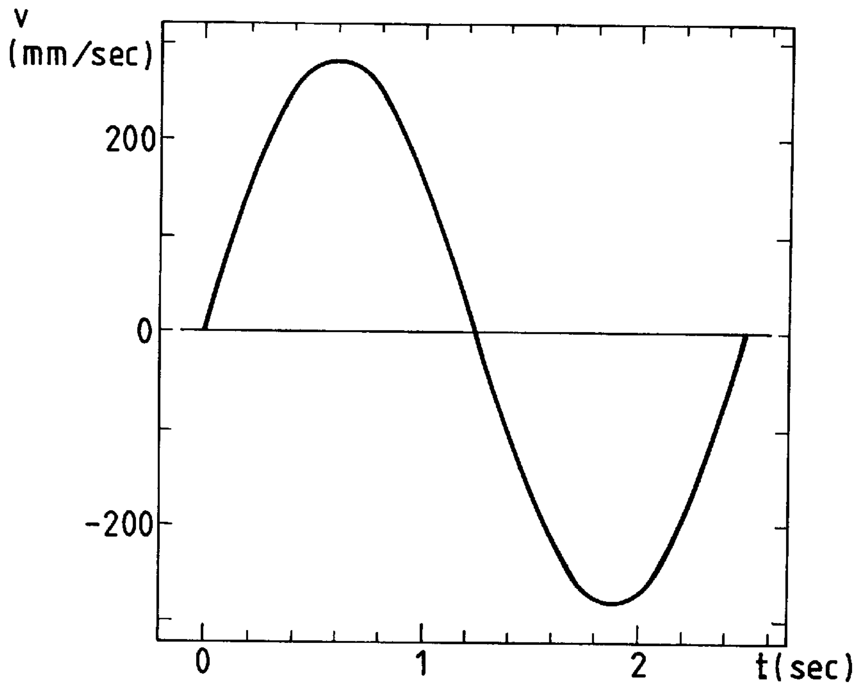
FIG. 3 is a graph showing the speed of a carriage according to the first embodiment of the present invention.
Figure 4:
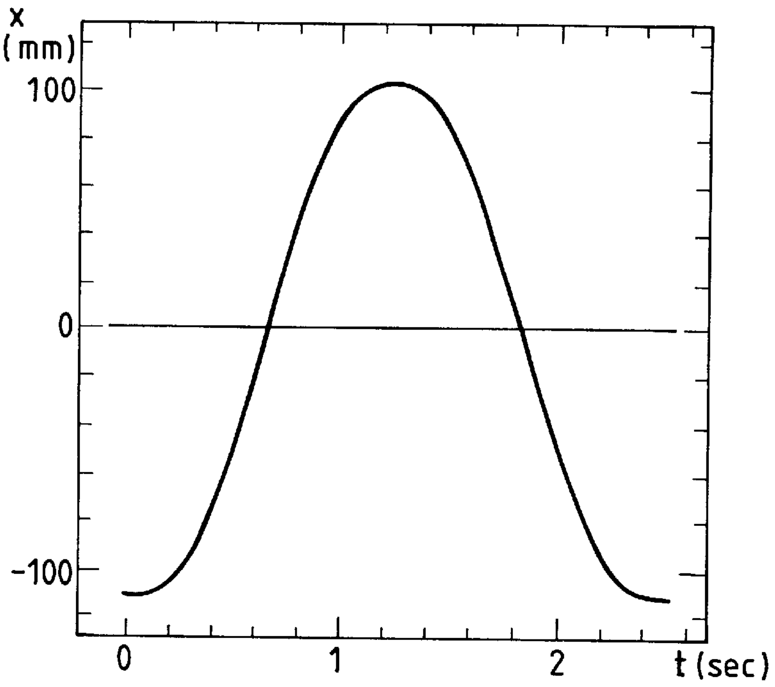
FIG. 4 is a graph showing the positional relationship of the carriage which is shown in FIG. 3.
Figure 5:
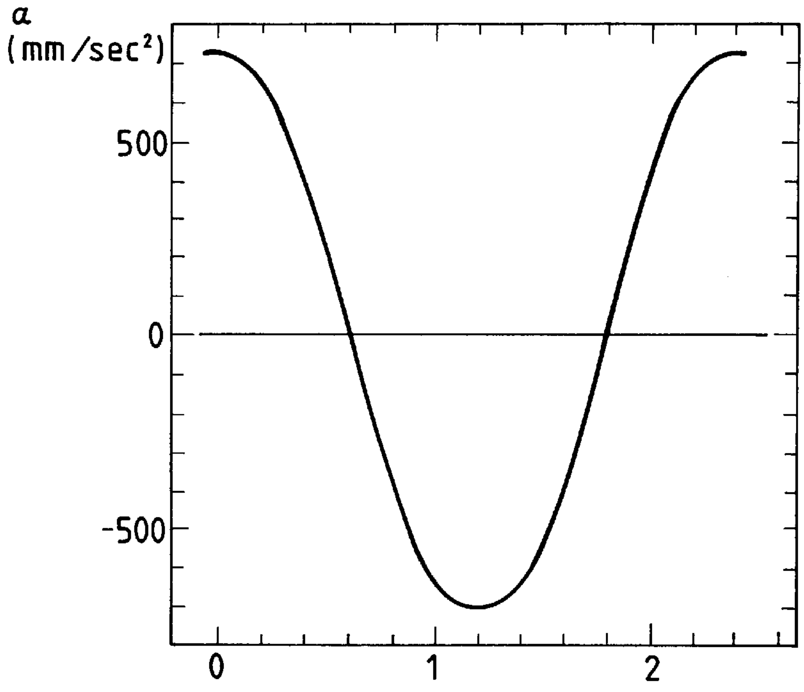
FIG. 5 is a graph showing the acceleration of the carriage which is shown in FIG. 3.

FIG. 3 shows a carriage speed, FIG. 4 shows a carriage position, and FIG. 5 shows a carriage acceleration.

As shown in FIG. 3, according to this embodiment, the carriage is reciprocated once in 2.5 sec. The maximum speed of the carriage is 282 mm/sec, and the corresponding drive frequency of the recording head is 4 kHz for a 360-dpi recording head.

The carriage speed can be expressed by the following equation:

$$v=282\sin(2\pi t/2.5)\text{(mm/sec)}$$

FIG. 4 shows a carriage position. The origin is the center of the platen. The moving distance of the carriage is 224 mm, and the width of the recording medium is 216 mm. Therefore, the recording head is moved by an excess of 4 mm in each of the right and left directions.

FIG. 5 shows the acceleration. The maximum acceleration is 709 mm/sec$^2$.

In this embodiment, the carriage speed in the forward direction is equal to that in the backward direction. When the recording medium is fed in the subscanning direction during movement of the carriage in the right and left 4-mm extra ranges, recording can be performed in both the forward and backward paths.

In this embodiment, since the maximum acceleration is small, the motor can be made compact. In addition, the recording speed is high although the maximum drive frequency of the recording head is low.

(Second Embodiment)

A printer of this embodiment is the same as that of the first embodiment, except for a carriage speed.

The carriage speed is represented by the following equation, i.e., terms of the first and third degrees.

$$v=317\sin(2\pi t/2.2)+35\sin(2\pi\times 3t/2.2)$$

Figure 6:
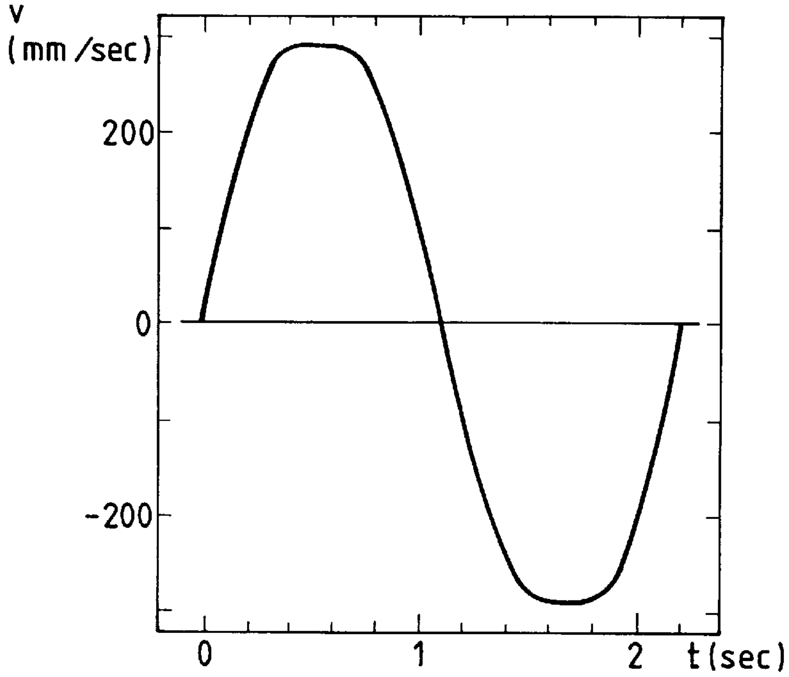
FIG. 6 is a graph showing the speed of a carriage according to the second embodiment of the present invention.

FIG. 6 shows a carriage speed. The maximum value of the carriage speed is equal to that (282 mm/sec) of the first embodiment. However, in this embodiment, the recording head is reciprocated once in 2.2 sec, which is higher than that of the first embodiment. The carriage speed is almost constant in the central portion.

Figure 7:
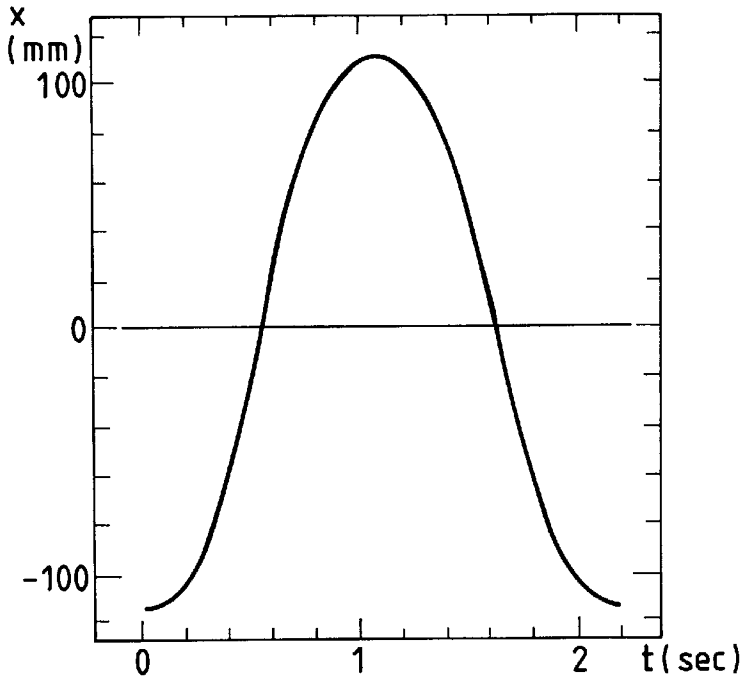
FIG. 7 is a graph showing the positional relationship of the carriage which is shown in FIG. 6.

FIG. 7 shows a carriage position. The moving distance of the carriage is 230 mm, which is larger than that of the first embodiment by 3 mm in each of the right and left directions.

Figure 8:
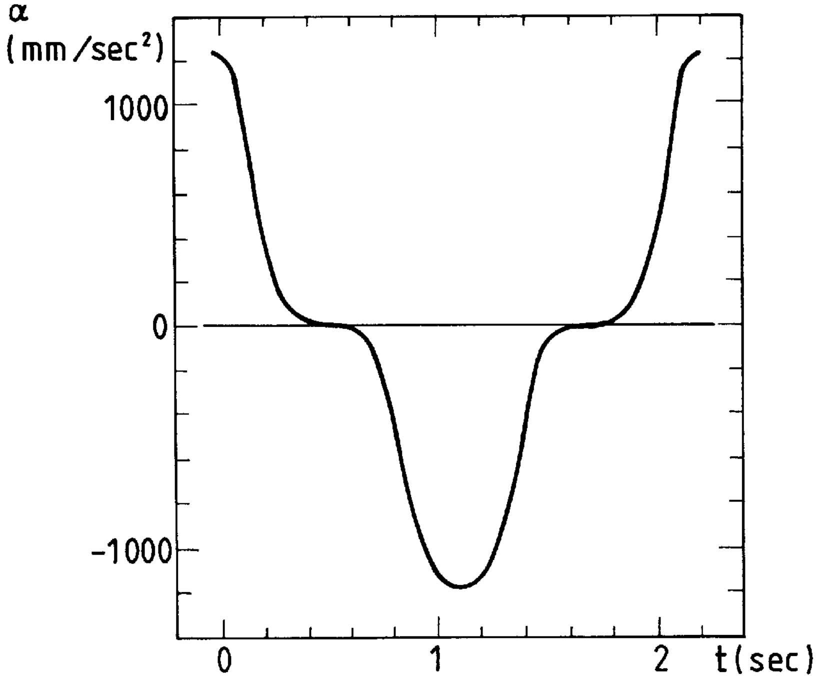
FIG. 8 is a graph showing the acceleration of the carriage which is shown in FIG. 6.

FIG. 8 shows an acceleration. The maximum value of the acceleration is 1,205 mm/sec$^2$, which is larger than that of the first embodiment, but is smaller than a conventional printer of this type.

Recording can be performed in both the forward and backward paths as in the first embodiment.

(Third Embodiment)

A printer of this embodiment is the same as that of the first embodiment, except for a carriage speed.

The carriage speed is expressed by the following equation, i.e., terms of first, second, and third degrees.

$$v=395\sin(2\pi t/1.6)-150\cos(2\pi t/1.6)+118\sin(2\pi\times 2t/1.6)+122\cos(2\pi\times 2t/1.6)-8\sin(2\pi\times 3t/1.6)+28\cos(2\pi\times 3t/1.6)$$

Figure 9:
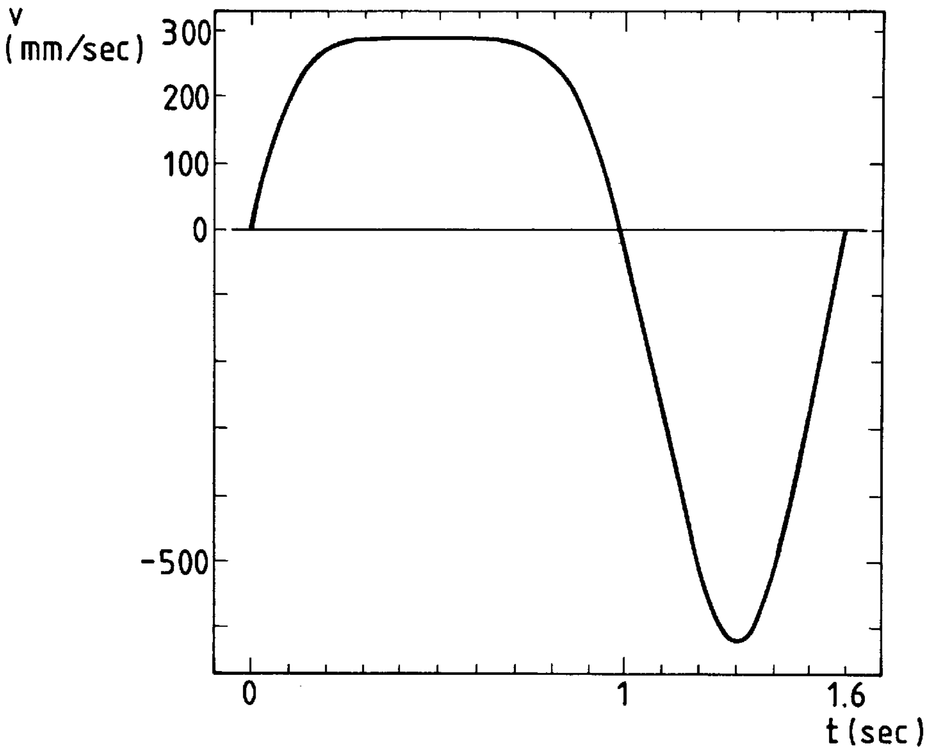
FIG. 9 is a graph showing the speed of a carriage according to the third embodiment of the present invention.

FIG. 9 shows a carriage speed. The positive maximum value of the carriage speed is 282 mm/sec, which is equal to that of the first embodiment. The maximum value in the reverse direction is 621 mm/sec. In this embodiment, the speed in the forward path is different from that of the backward path. A time required for reciprocating the carriage once is 1.6 sec, which is higher than those of the first and second embodiments. The third embodiment is suitable for recording in only the forward path.

Figure 10:
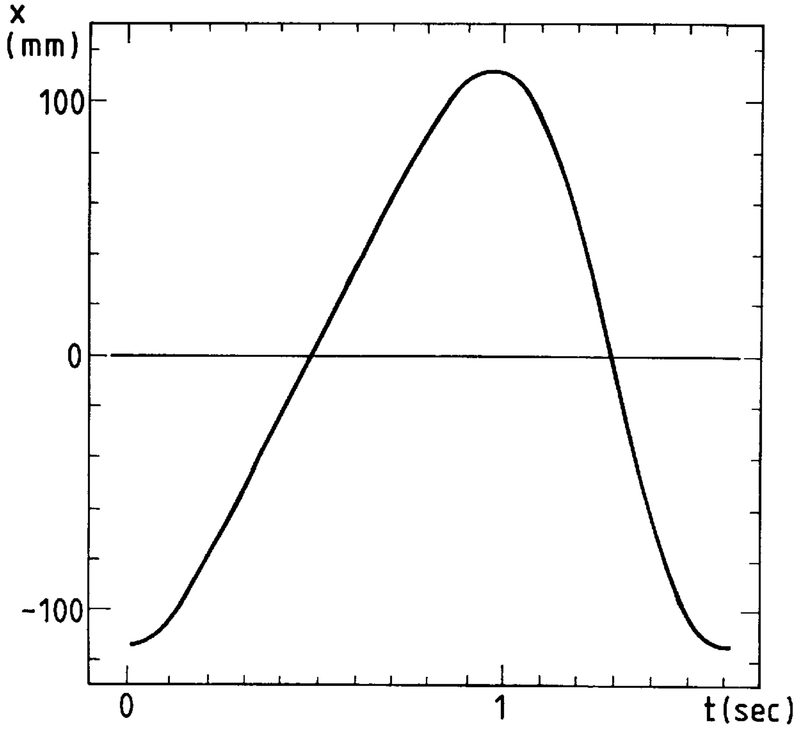
FIG. 10 is a graph showing the positional relationship of the carriage which is shown in FIG. 9.

FIG. 10 shows a carriage position. The moving distance of the carriage is 228 mm.

Figure 11:
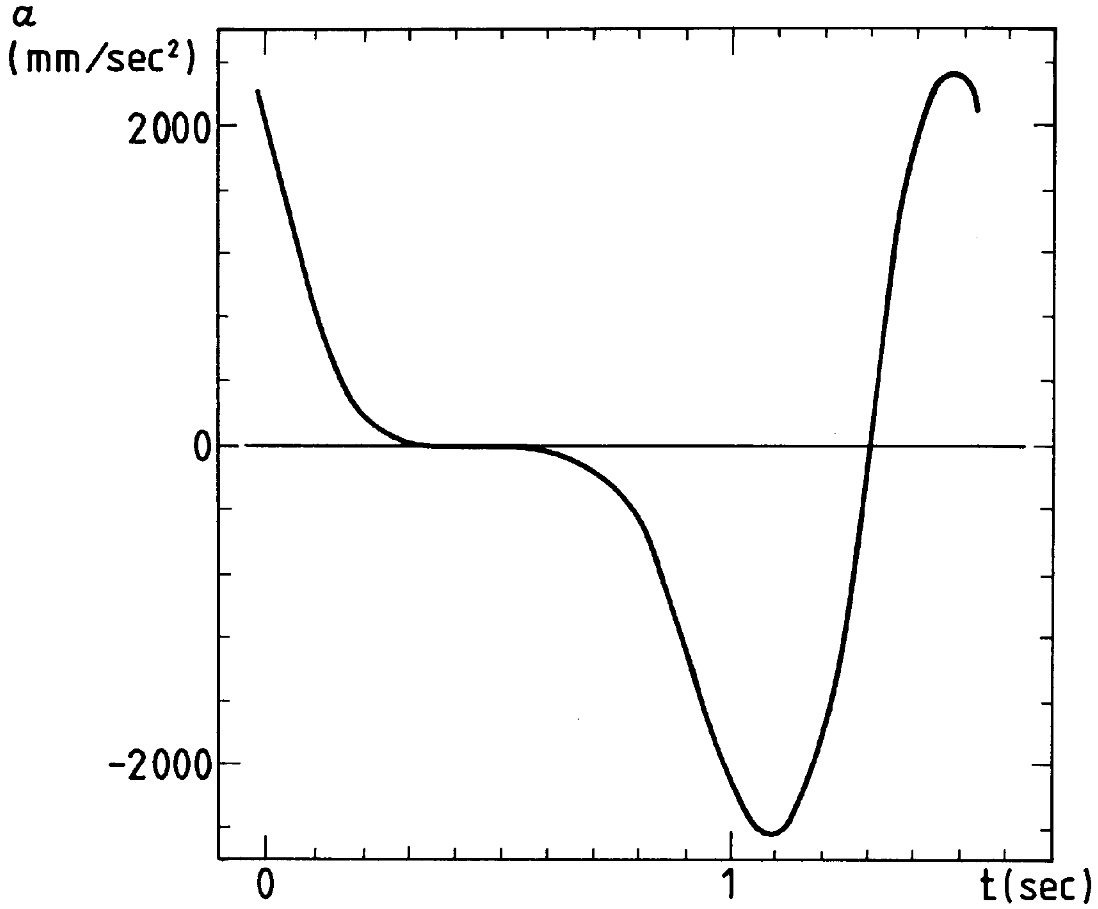
FIG. 11 is a graph showing the acceleration of the carriage which is shown in FIG. 9.

FIG. 11 shows an acceleration. The maximum value of the acceleration is present midway along the backward path and is 2,821 mm/cm$^2$.

In this embodiment, the range in which the carriage is moved can be wide as in the first and second embodiments. As can be apparent from FIGS. 9 and 10, however, the carriage is moved at an almost constant speed in a relatively wide range. For this reason, when an effective recording width is slightly reduced, recording may be performed only in the range wherein the carriage is moved at almost the constant speed.

(Other Embodiments)

In any of the embodiments described above, when the carriage starts its operation at the time of the start of recording, the carriage acceleration discontinuously changes, and vibrations may be generated accordingly. To avoid this, at the time of the start of recording, the carriage is excessively operated, and the acceleration at the time of start of recording is continuously changed to perform good recording.

In a printer which performs recording in only the forward path of the carriage, an operation in the backward path may be slightly different from that represented by the limited Fourier components described above, thus posing no problem. In the backward path, even if abnormal vibrations occur in the carriage, no problem occurs, provided that the vibrations are already attenuated prior to recording.

As has been described above, according to a system and method of driving a printer of the present invention, almost no approach range or deceleration range is required, so that the printer can be made compact. In addition, since the moving distance of the carriage can be reduced, a high-speed operation can be performed without increasing the drive frequency of the recording head.

What is claimed is:

1. A carriage drive control system for a printer, said system comprising:

a carriage, on which an ink-jet recording head is mounted, being reciprocated for recording scanning with the recording head and being smoothly movable in substantially an entire moving range without a substantial acceleration range and without a substantial deceleration range;

a motor for moving said carriage;

a motor driver for driving said motor to move said ink-jet recording head in accordance with a scanning position of said carriage; and control means for applying a drive signal to said motor driver to drive said motor, the drive signal being set such that a speed of said carriage is represented by a Fourier series and Fourier components of the speed consisting of terms not more than a third degree, in one reciprocal movement of said carriage.

2. A carriage drive control system for a printer, said system comprising:

a carriage, on which an ink-jet recording head is mounted, being reciprocated for recording scanning with the recording head, a movable range of said carriage being substantially the same as a width of a loaded recording medium;

a motor for moving said carriage;

a motor driver for driving said motor to move said ink-jet recording head in accordance with a scanning position of said carriage; and control means for applying a drive signal to said motor driver to drive said motor, the drive signal being set such that a speed of said carriage is represented by a Fourier series and Fourier components of the speed consisting of terms not more than a third degree, in one reciprocal movement of said carriage.

3. A carriage drive control method for a printer, said method comprising the steps of:

providing a carriage on which an ink-jet recording head is mounted to perform recording scanning by reciprocating with the recording head, the recording head being smoothly movable in an entire moving range without a substantial acceleration range and without a substantial deceleration range;

providing a motor for moving the carriage;

driving the motor provided in said providing step to move the ink-jet recording head in accordance with a scanning position of the carriage; and controlling driving of the carriage by applying a drive signal to a motor driver to drive the motor, the drive signal being set such that a speed of the carriage is represented by a Fourier series and Fourier components of the speed consisting of terms of not more than a third degree, in one reciprocal movement of the carriage.

4. A carriage drive control method for a printer, said method comprising the steps of:

providing a carriage on which an ink-jet recording head is mounted to perform recording scanning by reciprocating with the recording head, the recording head being smoothly movable in an entire moving range without a substantial acceleration range and without a substantial deceleration range;

providing a motor for moving the carriage;

driving the motor provided in said providing step to move the ink-jet recording head in accordance with a scanning position of the carriage; and controlling driving of the carriage by applying a drive signal to a motor driver to drive the motor, the drive signal being set such that a speed of the carriage is represented by a Fourier series and Fourier components of the speed consisting of terms of not more than a third degree, in one reciprocal movement of the carriage, and such that the speed of the carriage is set not to be constant even during a recording operation on the recording medium.

* * * * *

UNITED STATES PATENT AND TRADEMARK OFFICE

CERTIFICATE OF CORRECTION

PATENT NO. : 5,914,736

DATED : June 22, 1999

INVENTOR(S): YASUYUKI TAMURA

It is certified that error appears in the above-identified patent and that said Letters Patent is hereby corrected as shown below:

AT [56] REFERENCES CITED; FOREIGN PATENT DOCUMENTS

"1249373 10/1989 Japan" should read
--1-249373 10/1989 Japan--.

Signed and Sealed this

Twenty-first Day of November, 2000

Attest:

Q. TODD DICKINSON

*Attesting Officer* *Director of Patents and Trademarks*